(12) United States Patent
Hagen

(10) Patent No.: US 9,752,544 B2
(45) Date of Patent: Sep. 5, 2017

(54) FUEL SYSTEM

(75) Inventor: Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 335 days.

(21) Appl. No.: 13/328,339

(22) Filed: Dec. 16, 2011

(65) Prior Publication Data

US 2012/0160218 A1 Jun. 28, 2012

(30) Foreign Application Priority Data

Dec. 21, 2010 (DE) .................. 10 2010 055 320

(51) Int. Cl.
| | |
|---|---|
| *F02M 37/00* | (2006.01) |
| *B01D 46/00* | (2006.01) |
| *F02M 33/02* | (2006.01) |
| *B60K 15/035* | (2006.01) |
| *F02M 33/08* | (2006.01) |
| *B60K 37/04* | (2006.01) |

(52) U.S. Cl.
CPC ..... *F02M 37/0088* (2013.01); *B01D 46/0031* (2013.01); *B60K 15/03504* (2013.01); *B60K 37/04* (2013.01); *F02M 33/02* (2013.01); *F02M 33/025* (2013.01); *F02M 33/08* (2013.01); *B60K 2015/03509* (2013.01)

(58) Field of Classification Search
CPC ...... F02M 33/02; F02M 33/025; F02M 33/08; B60K 2015/03509; B60K 15/03504; B01D 46/0031
USPC ...... 123/516, 518, 519, 520, 525; 96/7, 139; 261/6
See application file for complete search history.

(56) References Cited

U.S. PATENT DOCUMENTS

| | | | | | |
|---|---|---|---|---|---|
| 1,654,577 | A | * | 1/1928 | Collins | .............. C10G 9/42 196/116 |
| 1,654,578 | A | * | 1/1928 | Collins | .............. C10G 9/42 196/115 |
| 2,025,059 | A | * | 12/1935 | Kermer | ............ B01D 9/0031 159/26.1 |
| 2,857,979 | A | * | 10/1958 | Dijck | ....................... 55/318 |
| 2,868,324 | A | * | 1/1959 | Anderson | .................. 494/35 |
| 3,266,262 | A | * | 8/1966 | Moragne | ........... B01D 5/0006 62/46.1 |
| 3,326,230 | A | * | 6/1967 | Ulrich | ................. F16K 24/04 137/199 |

(Continued)

FOREIGN PATENT DOCUMENTS

| | | |
|---|---|---|
| CN | 101734146 | 6/2010 |
| DE | 43 12 374 | 10/1994 |

(Continued)

OTHER PUBLICATIONS

Chinese Search Report with respect to counterpart Chinese patent application 201110432467.X.

(Continued)

*Primary Examiner* — Mahmoud Gimie
*Assistant Examiner* — Josh Campbell
(74) *Attorney, Agent, or Firm* — Henry M. Feiereisen LLC

(57) ABSTRACT

A fuel system in particular of a motor vehicle, includes a fuel tank and a ventilation device for ventilating the fuel tank. The ventilation device has at least one separation device which has a temporary accumulator for liquid fuel. The separation device is made at least in part of a porous material and/or is filled with the porous material.

14 Claims, 3 Drawing Sheets

(56) References Cited

U.S. PATENT DOCUMENTS

| | | | |
|---|---|---|---|
| 3,556,734 A * | 1/1971 | Peterson | B01D 47/06 |
| | | | 181/261 |
| 3,942,499 A | 3/1976 | Kunik et al. | |
| 4,658,796 A * | 4/1987 | Yoshida et al. | 123/519 |
| 4,717,401 A * | 1/1988 | Lupoli | B01D 53/0446 |
| | | | 96/141 |
| 4,960,153 A * | 10/1990 | Bergsma | 137/587 |
| 5,355,861 A * | 10/1994 | Arai | B60K 15/03504 |
| | | | 123/519 |
| 5,431,144 A | 7/1995 | Hyodo et al. | 123/520 |
| 5,716,522 A * | 2/1998 | Chilton | B01D 29/111 |
| | | | 210/317 |
| 5,850,821 A * | 12/1998 | Curtis | 123/524 |
| 6,557,719 B1 | 5/2003 | Arnal et al. | |
| 6,698,475 B2 * | 3/2004 | Schaefer | B60K 15/03504 |
| | | | 123/519 |
| 6,769,415 B2 * | 8/2004 | Reddy et al. | 123/519 |
| 6,777,364 B2 * | 8/2004 | Yoon et al. | 502/64 |
| 6,807,952 B1 * | 10/2004 | Amellal | B01D 35/0273 |
| | | | 123/516 |
| 7,225,798 B2 * | 6/2007 | Wang et al. | 123/518 |
| 7,353,809 B2 * | 4/2008 | Peterson et al. | 123/516 |
| 8,523,982 B2 * | 9/2013 | Suefuji | B01D 63/046 |
| | | | 95/45 |
| 2001/0052292 A1 * | 12/2001 | Ito | 96/134 |
| 2002/0157715 A1 * | 10/2002 | Viebahn | B60K 15/035 |
| | | | 137/588 |
| 2002/0174857 A1 | 11/2002 | Reddy et al. | |
| 2005/0098160 A1 | 5/2005 | Taxon | |
| 2005/0235968 A1 * | 10/2005 | Pachciarz | F02M 25/0836 |
| | | | 123/519 |
| 2007/0051346 A1 | 3/2007 | Peterson et al. | |
| 2009/0194076 A1 * | 8/2009 | Elwart et al. | 123/519 |
| 2010/0258085 A1 * | 10/2010 | Giorgetti | F02M 55/02 |
| | | | 123/470 |

FOREIGN PATENT DOCUMENTS

| | | | |
|---|---|---|---|
| DE | 43 12 374 A1 * | 10/1994 | |
| DE | 4312374 A1 * | 10/1994 | B60K 15/03504 |
| DE | 100 39 703 A1 | 3/2001 | |
| DE | 100 07 522 | 8/2001 | |
| DE | WO2006/041400 A1 | 4/2006 | |
| DE | 10 2009 006 160 | 8/2009 | |
| EP | 2 106 949 | 10/2009 | |
| FR | 2 262 609 A1 | 9/1975 | |
| IT | WO 2004/036024 * | 4/2004 | F02M 25/08 |
| JP | 2001-349251 | 12/2001 | |
| WO | WO 2004036024 A1 * | 4/2004 | |
| WO | WO2006/041400 | 4/2006 | |

OTHER PUBLICATIONS

Translation of Chinese Search Report with respect to counterpart Chinese patent application 201110432467.X.

* cited by examiner

FUEL SYSTEM

CROSS-REFERENCES TO RELATED APPLICATIONS

This application claims the priority of German Patent Application, Serial No. 10 2010 055 320.4, filed Dec. 21, 2010, pursuant to 35 U.S.C. 119(a)-(d).

BACKGROUND OF THE INVENTION

The invention relates to a fuel system in particular of a motor vehicle with a fuel tank and a ventilation device for ventilating the fuel tank, wherein the ventilation device has a separation device which has at least one temporary accumulator for liquid fuel.

Fuel systems of the aforementioned type are known from the state of the art. They are assigned for example to a motor vehicle or a drive system, respectively of the motor vehicle. The drive system includes in particular at least one internal combustion engine and is for example configured as hybrid drive system, i.e. it includes the internal combustion engine as well as at least one electrical machine, wherein the internal combustion engine and the electrical machine at least temporarily concertedly generate a drive torque of the drive system. The internal combustion engine is supplied with fuel from the fuel tank by the fuel system. Oftentimes, a volatile hydrocarbon fuel, for example gasoline, is used as fuel. The fuel tank therefore normally contains a volume of liquid fuel as well as a volume of gaseous fuel, which accrues in particular above the liquid fuel. The fuel tank can be a closed tank in particular a pressure tank, or a partially closed in particular also pressure free tank. The closed tank is used in particular for reducing emissions.

Due to temperature fluctuations of the fuel, for example caused by changes of the ambient temperature, pressure fluctuations can occur in the fuel tank. For this reason, the ventilation device is assigned to the fuel tank. It serves for ventilating the fuel tank. In this way, excessive pressure in the fuel tank can be reduced by the ventilating device. For this purpose the ventilation device ventilates the fuel tank for example by a ventilation line. During ventilation, gaseous as well as liquid fuel can exit the fuel tank through the ventilation device or the ventilation line. The ventilated fuel thus first exists as a mixture of gaseous and liquid fuel. This is particularly the case when the fuel tank is ventilated at a high inside pressure of the fuel tank. As a result of the high pressure or the great pressure difference, respectively, between the pressure inside the fuel tank and the pressure outside of the fuel tank, the ventilated fuel has high flow velocities, which causes liquid fuel to be carried along by the gaseous fuel.

The gaseous fuel may readily be supplied to the internal combustion engine or its intake system, wherein a fuel accumulator which is preferably configured as activated carbon filter can be provided between the fuel tank and the internal combustion engine. The fuel accumulator has the purpose to temporarily store gaseous fuel, i.e. to take up gaseous fuel when unused gaseous fuel is present and to give off gaseous fuel as soon as the gaseous fuel can be discharged into the internal combustion engine. However, liquid fuel must not enter the fuel accumulator or the internal combustion engine.

For this reason, the ventilation device is provided with the at least one separation device which serves for separating gaseous and liquid fuel. The separation device thus has the purpose to prevent the transfer of liquid fuel from the fuel tank through the ventilation device into the internal combustion engine. The separation device separates liquid fuel and allows gaseous fuel to pass. The separated liquid fuel reaches the temporary accumulator of the separation device. The term temporary accumulator does not mean that a (temporary) accumulation of the liquid fuel is indeed provided for. Rather, the liquid fuel can be discharged directly from the temporary accumulator or the separation device preferably in the direction of the fuel tank. Here, however, a rise of the fill level of the temporary accumulator may result for example due a limitation of the discharge volume flow, in particular by a cross section of a line or the like. Thus, the separated liquid fuel, at least temporarily, cannot be discharged at the same rate as it enters the temporary accumulator. Of course, a temporary storage of the liquid fuel, for example over a defined period of time can also be realized.

When operating the fuel system, the amount of liquid fuel present in the temporary accumulator or the separation device should be prevented from exceeding a threshold amount, i.e. from being greater than the fill level of the temporary accumulator, because this may impair the effectiveness of the separation device. The greater the amount of liquid fuel in the temporary accumulator, the greater is the risk that liquid fuel also exits the separation device together with the gaseous fuel and is carried along in the direction of the fuel accumulator or the internal combustion engine, respectively. For this reason, the fuel delivery unit can be assigned to the separation device. The fuel delivery unit is used to deliver liquid fuel out of the temporary accumulator, in particular in the direction of the fuel tank. The fuel delivery unit is usually configured as ejector pump wherein fuel which is delivered by a fuel pump of the fuel system out of the fuel tank in the direction of internal combustion engine, is often used as means for driving the ejector pump. In fuel systems known from the state of the art it may occur, however, that at least a portion of the liquid fuel exits the separation device again together with the gaseous fuel, in particular when a great volume flow of liquid fuel enters the ventilation device or the separation device, respectively.

SUMMARY OF THE INVENTION

Therefore, it is an object of the invention to propose a fuel system which has a separation device with improved separation efficiency in particular also in the case of an increased volume flow of liquid fuel.

According to the invention, this is attained by making the separation device, at least in part, of a porous material and/or the separation device is filled with the latter. The porous material is preferably arranged in the separation device such that fuel which is introduced into the separation device, in particular liquid fuel, flows through or at least against the porous material. Porous material in this context means a material which has or encloses, respectively, a plurality of recesses which can be at least partially in flow communication with one another. As an alternative, the recesses can, however, also be fluidly completely separated from one another. The porous material has a filter effect, which retains or at least decelerates the liquid fuel, i.e. decreases its flow velocity, while the gaseous fuel can pass through the porous material freely or with only a minor delay. The liquid fuel either sticks to the porous material itself or is separated from the flowing fuel as a result of the reduced flow velocity. In the latter case, the liquid fuel sinks downward in particular due to the influence of gravity and precipitates in the temporary accumulator. The fuel which accumulates at the porous material or in the temporary accumulator can then be discharged for example in the direction of the fuel tank. The separation efficiency of the separation device can be significantly improved by means of the porous material. In addition, the pressure loss of the separation device is decreased. The porous material is preferably permanently resistant against the fuel.

In a refinement of the invention, the separation device has multiple chambers which are separated at least in part from one another by at least one partitioning wall. Preferably, the chambers are located in the temporary accumulator, so that the latter is divided into the chambers. The chambers are merely separated spatially from one another but not necessarily fluidly. It is therefore well possible that the chambers are spatially completely separated from one another by means of the partitioning wall, however, the partitioning wall is constructed from a fuel-permeable material or constructed to allow the fuel to pass through. In this way, at least two of the chambers are each in flow communication with one another. As an alternative or in addition it can also be provided that the chambers are spatially separated from one another only in part. In this case, the fuel can flow around the partitioning wall and thus move from one chamber into another chamber or vice versa. The chambers can have the same size, i.e. have the same volume or be configured having different sizes. For example, the chamber which is assigned to an inlet of the separation device can be greater than a chamber which is arranged adjacent to the first chamber.

In a refinement of the invention, the partitioning wall is arranged in a flow path of the separation device. The flow path of the separation device is the path through which the fuel flows through the separation device or, respectively, through which it would flow without the partitioning wall. The partitioning wall thus is to be arranged in the separation device so that the fuel flowing through the separation device is redirected by the partitioning wall, wherein the fuel preferably impacts the latter, preferably perpendicularly. In this way, drops of the liquid fuel become stuck on the partitioning wall so that a drop film forms on the partitioning wall. This drop film then absorbs further liquid fuel which is contained in the fuel which flows through the separation device. The gaseous fuel on the other hand is merely redirected by the partitioning wall and continues to flow through the separation device. The drop film is preferably discharged by the influence of gravity, in particular in the direction of the temporary accumulator in which the liquid fuel is collected.

In a refinement of the invention, the partitioning wall is made at least in part of the porous material, in particular the entire partitioning wall is made of the porous material and/or is coated at least in part with the latter. By means of the porous material, the filter effect of the separation device or the partitioning wall can be further increased. In particular when the partitioning wall is made at least in part of the porous material the flow resistance against the fuel which flows through the separation device can be decreased. In this way, a smaller pressure loss of the separation device is achieved and thus the energy requirement decreased. The partitioning wall is preferably made entirely of the porous material in the direction of its smallest dimensions and/or in the direction of the flow path. In addition or as an alternative, the partitioning wall can have at least a partial coating made of the porous material. In this case, the partitioning wall is made of a core of any material for example a plastic onto which the porous material is deposited. The coating made of the porous material can also be arranged on the core such that an outflow path for the liquid fuel exists through which fuel which is separated on the partitioning wall is discharged. This is in particular advantageous when the recesses of the porous material are flow channels which are oriented in the direction of the flow path, i.e. are perpendicular to the outflow path and to the core of the partitioning wall.

In a refinement of the invention, at least a sub-space of the temporary accumulator and/or at least some areas of at least one of the chambers are filled with the porous material. In particular when the separation device is not divided into chambers, the porous material is present at least in the sub-space of the temporary accumulator. For separating liquid fuel from the fuel which enters the separation device, the fuel flows through the temporary accumulator. Additionally or as an alternative, at least one chamber can be filled with the porous material. This means that liquid fuel is efficiently separated from fuel which flows through the chambers or the temporary accumulator by means of the porous material.

In a refinement of the invention, an inlet of the separation device which leads into the temporary accumulator has a diffuser which has a cross section which increases in the direction of the temporary accumulator. The cross section increases in the direction of the flow; the fuel which enters the separation device thus is decelerated in the diffuser due to the increasing cross section. Preferably, the diffuser has a circular cross section. Due to the decreased velocity with which the fuel enters the separation device, the cross section of the latter is used more efficiently for separating the liquid fuel. In this way, in particular a decrease of the flow resistance and with this a decrease of the pressure loss of the fuel when flowing through the separation device can be achieved as well. In addition, the decreased velocity decreases the risk that gaseous fuel carries along liquid fuel again after the separation of the latter.

In a refinement of the invention, the porous material is sponge-like or filter-like, in particular a non woven material. Sponge-like means that the material has a plurality of hollow spaces which are arranged offset to one another and which are at least partially in flow communication with one another. When the porous material is filter-like it is interfused by multiple flow channels which are not in flow communication with one another. The fuel can flow through the flow channels from one side of the porous material to the other, wherein due to the cross section of the flow channels, the porous material functions as sieve. The liquid fuel can flow through the porous material less easily than the gaseous fuel. The porous material is for example a non woven material, i.e. a textile fabric structure from individual unordered fibers. As an alternative, the porous material can of course also be a fabric, mesh fabric or knitted fabric or a membrane.

In a refinement of the invention a ventilation valve is fluidly arranged downstream or upstream of the separation device for ventilating the fuel tank by the separation device. The ventilation valve is assigned to the ventilation device. The ventilation valve can be set so that it opens for ventilating the fuel tank or closes for terminating the ventilation. It is for example a FTIV (Fuel Tank Isolation Valve). The ventilation valve can be configured as timing valve which allows setting discrete switching conditions (open and closed). Particularly preferably, the ventilation valve is configured as proportional valve, which does not merely allow the discrete switching states but allows setting the flow through cross section in multiple stages, preferably a continuous setting. In this way, the volume flow through the separation device can be set in particular continuously, controlled and/or regulated. The ventilation valve is fluidly arranged downstream or upstream of the separation device, the fuel thus always has to also pass the ventilation valve for flowing through the separation device. The ventilation valve can be integrated with the separation device or the fuel delivery unit. The ventilation valve can thus be integrated into the fuel delivery unit in a modular fashion.

In a refinement of the invention, a ventilation valve which switches in dependence on the fill level of the fuel tank and/or at least one safety valve which is assigned to the fuel tank are fluidly arranged upstream of the separation device. The ventilation valve is in particular configured as FLVV 9Fill Limit Venting Valve). The latter allows ventilating the fuel tank so long as the fuel tank fill level is smaller than a defined fuel fill level, in particular a maximal fuel tank fill level. Ventilation of the fuel tank is thus ensured via the ventilation valve, in particular when fuel is added to the fuel tank. In addition or as alternative, the safety valve can be provided which is configured for example as ROV (Roll Over Valve). The ventilation valve as well as the safety valve is usually assigned to the fuel tank and fluidly arranged upstream of the separation device, so that the fuel first passes through the ventilation valve before entering the separation device.

The invention also relates to a drive system with a fuel system according to the above description. In particular, the drive system has at least one internal combustion engine and is for example configured as hybrid drive system.

BRIEF DESCRIPTION OF THE DRAWING

In the following, the invention is explained in more detail with reference to the exemplary embodiments shown in the drawing, without narrowing the invention. It is shown in.

DETAILED DESCRIPTION OF PREFERRED EMBODIMENTS

Figure 1:
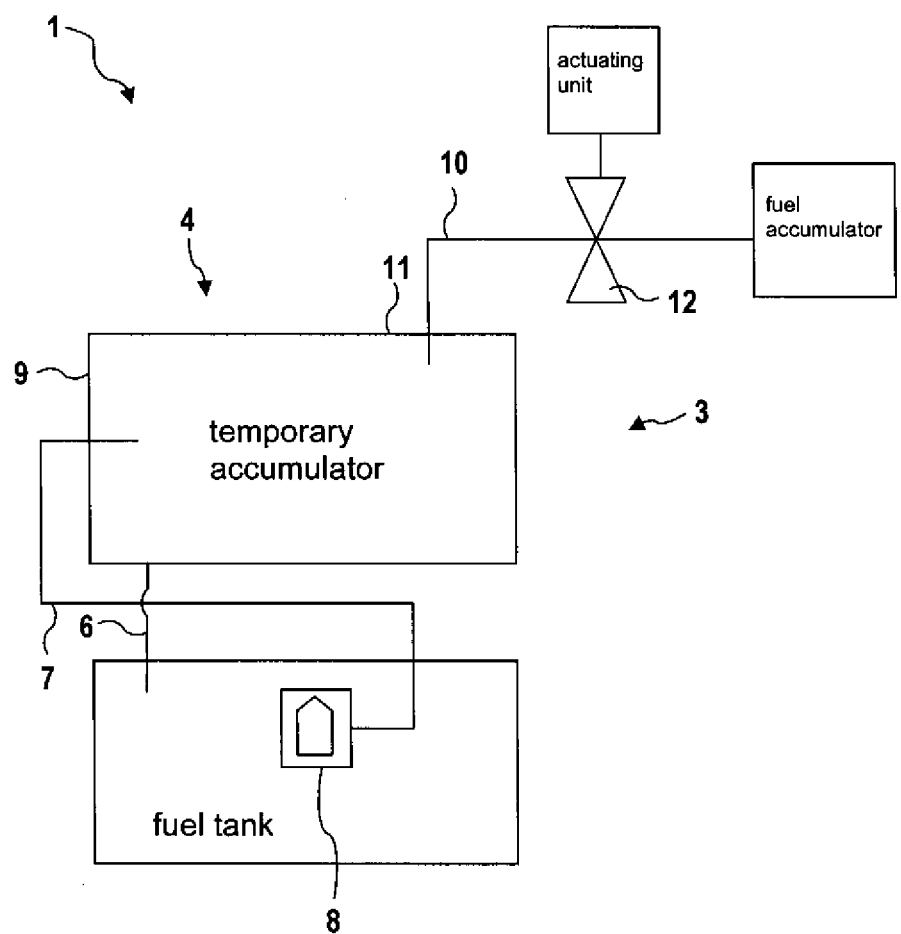
FIG. 1 a schematic representation of a fuel system with a separation device.

FIG. 1 shows a schematic representation of a fuel system 1. The fuel system 1 is for example part of a motor vehicle or a drive system of the motor vehicle. The fuel system 1 has a fuel tank 2 and a ventilation device 3 for ventilating the fuel tank 1. The ventilation device 3 has a separation device 4 with a temporary accumulator 5. The separation device 4 serves for separating liquid fuel from gaseous fuel. The separated liquid fuel is then present in the temporary accumulator 5 and can for example be fed back to the fuel tank 2 by a return line 6. The return line 6 preferably has a valve in particular a drainage valve or check valve. Instead of the return line 6, only the valve may be provided, in particular when at least some sections of the separation device 4 are located in the fuel tank 2, so that fuel which exits the temporary accumulator 5 enters directly into the fuel tank through the valve. The valve is configured such that fuel can only exit from the temporary accumulator 5 through the return line 6 but cannot enter the temporary accumulator 5. This prevents fuel from exiting the fuel tank 2 and entering the temporary accumulator 5 through the return line 6.

The ventilation device 3 is in flow communication with the fuel tank via a ventilation line 7. A ventilation valve 8 is provided on the side of the ventilation line 7 which faces the fuel tank 2 or is provided in the fuel tank 2, which ventilation valve 8 switches in dependence on the tank fill level. Usually, the ventilation valve 8 is configured such that it is only open when the fuel tank fill level is below a defined fuel tank fill level, in particular below a maximal fuel tank fill level, i.e. fuel, in particular liquid fuel can exit the fuel tank and enter the ventilation line 7. The ventilation line 7 leads into the temporary accumulator 5 of the separation device 4, preferably through a sidewall 9 or a bottom of the temporary accumulator 5. At a distance to the ventilation line 7 or its site of entry into the temporary accumulator 5, an outlet line 10 leads into the temporary accumulator 5, preferably through a ceiling 11 of the temporary accumulator 5. The site of entry of the outlet line 10 into the temporary accumulator 5 is thus preferably arranged such that only gaseous fuel can exit the temporary accumulator 5 and enter the outlet line 10. The sites of entry of outlet line 10 and ventilation line 7 are preferably arranged at opposing sides of the temporary accumulator 5. The outlet line 10 has a ventilation valve 12 which can be actuated by means of an actuating unit 13. The ventilation valve 12 and the actuating unit 13 are preferably configured so that the flow through cross section of the ventilation valve 12 can be set continuously. On the side which faces away from the separation device 4, the outlet line 10 leads into a fuel accumulator 14, in particular an activated carbon filter. The fuel accumulator 14 serves for temporarily storing the gaseous fuel.

Usually, at least some sections of the separation device 4 in particular the entire separation device 4, is arranged in the fuel tank 2. However, an arrangement outside of the fuel tank 2 is also possible. As an alternative, the separation device 4 can also be integrated in a line, for example the ventilation line 7. In a preferred embodiment, the separation device is configured so that it or the ventilation device 3, respectively, has a defined pressure loss. The latter is chosen so that when ventilating the fuel tank 2 by means of the ventilation device 3, a valve which may be present, for example the ventilation valve 8, is not brought into its closed position. The ventilation valve 8 usually has a float which leaves a valve seat of the ventilation valve 8 exposed so long as the fuel fill level is smaller than a defined fuel tank fill level. When the volume flow which is discharged by means of the ventilation device, i.e. the ventilation valve 8, is greater than a design volume flow, the float can be displaced into the valve seat, i.e. the closed position, by the volume flow or the ventilated fuel, so that a further ventilation of the fuel tank 2 is not possible. This applies in particular when the ventilation valve 12 is completely closed.

Usually, the pressure loss of the ventilation device 3 is set by adjusting the ventilation valve 12, for example by introducing a throttle element. In this case, the pressure loss of the ventilation device 3 preferably takes place by adjusting the separation device 4 or the pressure loss respectively, of the latter for example by providing an adjusted throttle element. Preferably, the ventilation valve 12 has no throttle element. However, the throttle element can of course be provided additionally.

Figure 2:
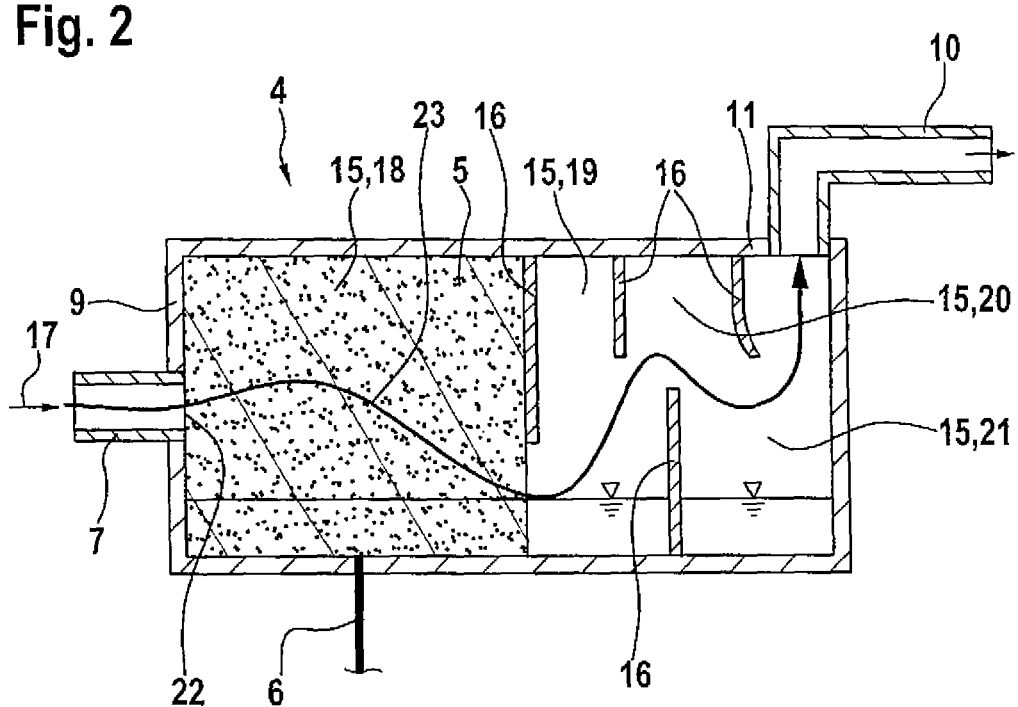
FIG. 2 the separation device in a first embodiment.

FIG. 2 shows a first embodiment of the separation device 4. The separation device 4 has multiple chambers 15, which are separated from one another at least in part by partitioning walls 16. The partitioning walls 16 project in the direction of the flow (arrow 17)—in particular mutually—from confronting walls into the temporary accumulator 5 so that the latter is divided into the chambers 15. In the present case, four chambers are provided so that a first chamber 18, a second chamber 19, a third chamber 20 and a fourth chamber 21 are present. In principle, any number of chambers 15 can be provided in the temporary accumulator 5. In the embodiment shown here, the first chamber 18 is completely filled with a porous material. The fuel which enters the separation device 4 or the temporary accumulator 5 through an inlet 22, flows through the porous material which is arranged in the first chamber 18 to enter the chambers 19, 20 and 21 which are positioned downstream in the direction of flow.

Due to the sponge-like or filter-like configuration of the porous material, at least a portion of the liquid fuel is separated in the porous material from the fuel or fuel mixture which flows into the separation device 4. Usually, the liquid fuel is present in the gaseous fuel in the form of drops. The drops from liquid fuel become attached on or at the porous material and can then be discharged for example due to gravity. The thus separated liquid fuel can be at least temporarily stored in the temporary accumulator 5 or directly discharged out of the latter through the return line 6, preferably in the direction of the fuel tank 2. Using the porous material does not only improve the separation effect of the separation device 4 but also decreases the pressure loss of the latter.

The partitioning walls 16 are arranged in a flow path 23 of the separation device 4 or the temporary accumulator 5. This means that the partitioning walls 16 achieve a redirection of the fuel which flows through the separation device 4. As a result of this redirection, liquid fuel is in turn separated from the fuel and moved into the temporary accumulator 5. Ideally, any liquid fuel which is contained in the fuel is separated in the separation device 4, so that only gaseous fuel is present in the outlet line 10.

Figure 3:
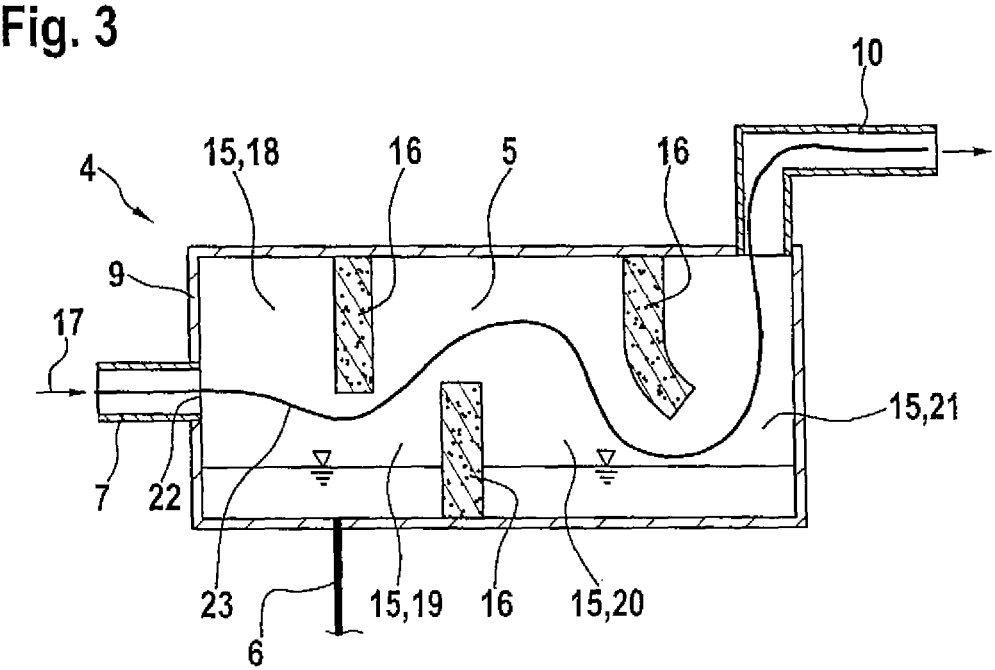
FIG. 3 the separation device in a second embodiment.

FIG. 3 shows a second embodiment of the separation device 4. In this embodiment, the partitioning walls 16 are again arranged in the flow path 23, i.e. a change in direction of the fuel which flows through the separation device is achieved. The partitioning walls 16 are made of the porous material or are coated with the latter. When flowing through the separation device 4, the fuel contacts the partitioning walls 16 and with this the porous material. In this way, the separation efficiency of the separation device 4 is significantly increased.

Figure 4:
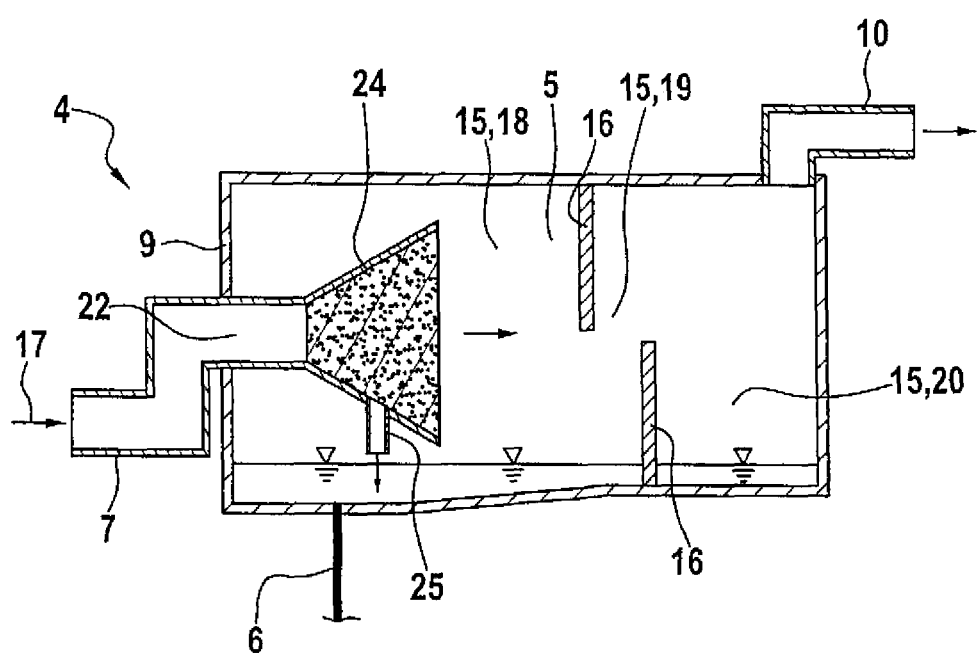
FIG. 4 the separation device in a third embodiment.

FIG. 4 shows a third embodiment of the separation device 4. In this embodiment the inlet 22 has a diffuser 24, wherein the cross section of the diffuser 24 increases in the direction of the temporary accumulator 5. The fuel which flows into the separation device 4 is thus first decelerated before entering the first chamber 18. The diffuser 24 can include the porous material at least in some areas or the diffuser 24 can be filled with the porous material. Particularly preferred is a drain 25 provided on the diffuser 24, so that liquid fuel accruing in the diffuser 24 can exit the latter and enter the temporary accumulator 5. In the shown embodiment the temporary accumulator 5 is also divided into chambers 15 by means of partitioning walls 16, wherein here only the first chamber 18, the second chamber 19 and the third chamber 20 are present. Of course, any number of partitioning walls 16 and chambers 15 can be provided in this embodiment as well.

At least the embodiments of FIGS. 2 and 3 have in common, that the partitioning wall 16 which is adjacent to the outlet line 10 is curved in the direction of the outlet line 10 or the site of entry of the latter, respectively, into the temporary accumulator 5. The free end of the partitioning wall 16 is displaced in the direction of the outlet line 10 so that this site of entry is at least partially covered. Of course, such a configuration of the partitioning wall 16 can also be provided for the third embodiment of FIG. 4.

LIST OF REFERENCE SIGNS 1 fuel system
2 fuel tank
3 ventilation device
4 separation device
5 temporary accumulator
6 return line
7 ventilation line
8 ventilation valve
9 sidewall
10 outlet line
11 ceiling
12 ventilation valve
13 actuating unit
14 fuel accumulator
15 chamber
16 partitioning wall
17 arrow
18 first chamber
19 second chamber
20 third chamber
21 fourth chamber
22 inlet
23 flow path
24 diffuser
25 drain

What is claimed is:

1. A fuel system, comprising:
a fuel tank;
a ventilation device for ventilating the fuel tank, said ventilation device including at least one separation device receiving a mixture containing liquid and gaseous fuel and separating the liquid fuel from the gaseous fuel and having a temporary accumulator accumulating the separated liquid fuel; and
a return line connecting the temporary accumulator with the tank for conducting fuel from the temporary accumulator to the fuel tank wherein the separation device has a plurality of chambers which are spaced from one another in a horizontal direction from an inlet towards an outlet of the separation device arranged on opposing sides of the separation device, and are separated from one another, at least in part, by vertical partitioning walls protruding vertically from opposing upper and lower horizontal sides of the separation device into the separation device in alternating succession along a flow path of the mixture of liquid and gaseous fuel, said plurality of chambers receiving the mixture containing liquid and gaseous fuel,
wherein a first one of the chambers as considered in a horizontal direction from an inlet towards an outlet of the separation device has in its interior a porous element in contact with the mixture containing liquid and gaseous fuel,
wherein the partitioning walls separating the chambers from one another are made, at least in part, of the porous material or are coated, at least in part, with the porous material.

2. The fuel system of claim 1, wherein the partitioning walls are made in their entirety of the porous material.

3. The fuel system of claim 1, wherein the separation device has an inlet in communication with the temporary accumulator, and the porous element is a diffuser arranged in the inlet and having a cross section which increases in a direction of the temporary accumulator.

4. The fuel system of claim 3, wherein the diffuser includes the porous material, at least in some areas, and/or is filled, at least in part with the porous material.

5. The fuel system of claim 1, wherein the porous material is spongy.

6. The fuel system of claim 1, wherein the porous material is of filter type.

7. The fuel system of claim 1, wherein the porous material is a non-woven material.

8. The fuel system of claim 1, further comprising at least one ventilation valve fluidly arranged upstream or downstream of the separation device for ventilating the fuel tank by the separation device.

9. The fuel system of claim 1, further comprising at least one ventilation valve fluidly arranged upstream of the separation device and switching in dependence on a tank fill level.

10. The fuel system of claim 1, further comprising at least one safety valve arranged upstream of the separation device and operably connected to the fuel tank.

11. The fuel system of claim 1, further comprising a fuel accumulator, said temporary accumulator being connected with the fuel accumulator via an outlet line.

12. The fuel system of claim 1, wherein the separation device is connected to the fuel tank by the return line extending vertically downwardly from the separation device to the fuel tank so that a flow of the mixture ventilated from the fuel tank enters the separation device in its entirety.

13. The fuel system of claim 1, wherein the mixture flows from the inlet to the outlet along a flow path without reversal of a direction of flow.

14. A motor vehicle comprising:
a fuel system including
a fuel tank,
a ventilation device for ventilating the fuel tank, said ventilation device including at least one separation device receiving a mixture containing liquid and gaseous fuel and separating the liquid fuel from the gaseous fuel and having a temporary accumulator accumulating the separated liquid mixture containing liquid and gaseous fuel, and
a return line connecting the temporary accumulator with the tank for conducting fuel from the temporary accumulator to the fuel tank wherein the separation device has a plurality of chambers which are spaced from one another in a horizontal direction from an inlet towards an outlet of the separation device arranged on opposing sides of the separation device, and are separated from one another, at least in part, by vertical partitioning walls protruding vertically from opposing upper and lower horizontal sides of the separation device into the separation device in alternating succession along a flow path of the mixture of liquid and gaseous fuel, said plurality of chambers receiving the mixture containing liquid and gaseous fuel,
wherein a first one of the chambers as considered in a horizontal direction from an inlet towards an outlet of the separation device has in its interior a porous element in contact with the mixture containing liquid and gaseous fuel,
wherein the partitioning walls separating the chambers from one another are made, at least in part, of the porous material or are coated, at least in part, with the porous material.

* * * * *